United States Patent
Goedken et al.

(10) Patent No.: US 10,221,870 B2
(45) Date of Patent: Mar. 5, 2019

(54) FELLING SAW RECOVERY CONTROL

(71) Applicant: DEERE & COMPANY, Moline, IL (US)

(72) Inventors: Nicholas M. Goedken, Dubuque, IA (US); Calin Raszga, Asbury, IA (US); Matthew J. Ramler, Luxemburg, IA (US)

(73) Assignee: DEERE & COMPANY, Moline, IL (US)

( * ) Notice: Subject to any disclaimer, the term of this patent is extended or adjusted under 35 U.S.C. 154(b) by 409 days.

(21) Appl. No.: 14/677,784

(22) Filed: Apr. 2, 2015

(65) Prior Publication Data

US 2016/0146226 A1 May 26, 2016

Related U.S. Application Data (60) Provisional application No. 62/084,806, filed on Nov. 26, 2014.

(51) Int. Cl.
*F15B 13/04* (2006.01)
*A01G 23/091* (2006.01)
*B23D 47/12* (2006.01)
*F15B 15/08* (2006.01)

(52) U.S. Cl.
CPC ........ *F15B 13/0401* (2013.01); *A01G 23/091* (2013.01); *B23D 47/12* (2013.01); *F15B 15/08* (2013.01); *F15B 2211/20546* (2013.01)

(58) Field of Classification Search
CPC ............. F16H 61/4008; F16H 61/4035; F16H 61/4052; F16H 61/421; F16H 61/431; F16H 61/47
See application file for complete search history.

(56) References Cited

U.S. PATENT DOCUMENTS 3,848,648 A * 11/1974 Dika .................... A01G 23/091
 144/34.1
4,450,818 A * 5/1984 Thoma .................... F02D 1/183
 123/357

(Continued)

FOREIGN PATENT DOCUMENTS

EP 2899432 A2 * 7/2015 ............. F03D 15/00

*Primary Examiner* — Michael Leslie
*Assistant Examiner* — Matthew Wiblin
(74) *Attorney, Agent, or Firm* — Klintworth & Rozenblat IP LLP (57) ABSTRACT

A hydraulic system for a felling saw head includes a hydraulic motor, operatively coupled to a saw disc of the saw head, a hydraulic variable displacement pump, operatively coupled to the hydraulic motor to supply pressurized fluid to the motor, and a controller configured to control the pump. To provide a target operating speed of the saw disc, the motor is configured to operate at a first displacement corresponding to a first flow rate of hydraulic fluid through the motor During at least a part of a saw recovery operation, the controller controls the pump to operate at a current pump displacement that results in a flow rate of hydraulic fluid through the pump that exceeds the first flow rate through the motor. Saw recovery time may be reduced without overspeeding the saw by including a metered flow control device between the pump and the motor.

14 Claims, 5 Drawing Sheets

(56) References Cited

U.S. PATENT DOCUMENTS

| | | | | |
|---|---|---|---|---|
| 5,355,675 | A | * | 10/1994 | Mayhugh .................. B66D 1/44 60/327 |
| 7,076,947 | B2 | * | 7/2006 | Ariga .................... E02F 9/2232 60/452 |
| 7,481,051 | B2 | * | 1/2009 | Bergquist .............. F04B 35/002 144/34.1 |
| 8,571,753 | B2 | | 10/2013 | Robillard et al. |
| 2008/0066701 | A1 | * | 3/2008 | Sun ........................... F01L 9/02 123/90.11 |
| 2010/0132352 | A1 | * | 6/2010 | Throckmorton .... F16H 61/4017 60/422 |
| 2010/0263361 | A1 | * | 10/2010 | Kodaka .............. F16H 61/4035 60/445 |

\* cited by examiner

FELLING SAW RECOVERY CONTROL

CROSS-REFERENCE TO RELATED APPLICATION(S)

This application claims priority under 35 U.S.C. § 119 to U.S. Provisional Application No. 62/084,806, filed Nov. 26, 2014, the disclosure of which is incorporated herein by reference.

STATEMENT OF FEDERALLY SPONSORED RESEARCH OR DEVELOPMENT

Not applicable.

FIELD OF THE DISCLOSURE

This disclosure relates to hydraulically driven saws, and in particular to the hydraulic control of tree-felling saw heads to improve saw recovery.

BACKGROUND OF THE DISCLOSURE

In the forestry industry wheeled and tracked feller buncher machines may be utilized to harvest standing trees. Saw heads may be mounted to the feller buncher machines, for example to a boom arm, which have one or more large saw discs with peripheral teeth. The saw head may be driven by the hydraulic system of the machine such that the saw disc is rotated. The rotating saw may thereby cut into tree trunks to fell the standing trees. The saw head may include a large grapple or other clamping arrangement, which may be secured around the tree trunk so that after the tree is felled it may be carried to a transport machine or stacked for later pick-up and transport by a forwarder or the like.

During operation, the saw disc may be rotated with large angular velocities to facilitate efficient cutting of the selected trees. It is common to leverage kinetic inertia to a large degree during a felling operation, such that much of the cutting force applied by the saw head is due to the relatively large inertia of the saw disc. In such a case, the hydraulic system may be configured primarily to initiate start-up rotation of the saw disc, by driving the saw disc to overcome the static inertia of the saw disc. In particular, the hydraulic system is required to drive the saw disc during periods of recovery (e.g., after the saw disc is slowed from a prior felling operation) to bring it up to speed for the current felling operation. Typically, it is desired that the recovery time be minimized so that the machine may perform consecutive felling operations rapidly. Once a saw disc is spinning at operating speeds, the hydraulic system may also be utilized to maintain the saw speed at appropriate levels.

It is known to control the hydraulic system of the machine in order to supply the necessary power to meet the demands of the saw head. Available power in part is dependent on the state of the engine and the demands of the other hydraulic systems of the machine. Some control schemes regulate hydraulic power to the saw head according to engine speed. Other schemes seek to prioritize saw head power by de-stroking the main pump of the hydraulic system so that demands on the engine from other hydraulic systems do not override the available engine power, and thus do not compromise saw head power and the felling operation, which is the chief purpose of the machine. However, prioritizing saw operation over the main hydraulic system has obvious disadvantages, including slowed or impaired operation of one or more other hydraulic systems of the machine. Even so, such a control scheme often provides slow saw recovery relative to the operational times of other hydraulic systems of the machine, particularly in modern machines using electronic control of the hydraulic system which map the hydraulic power demands to the power and torque characteristics of the particular engine in the machine.

SUMMARY OF THE DISCLOSURE

This disclosure relates to tree felling saw heads and hydraulic control systems to improve saw recovery.

According to one aspect of the disclosure, a hydraulic system for a felling saw head includes a hydraulic motor operatively coupled to a saw disc of the saw head and configured to operate at a first motor displacement to provide a target operating speed of the saw disc, the first motor displacement corresponding to a first flow rate of hydraulic fluid through the motor. A hydraulic variable displacement pump is operatively coupled to the hydraulic motor to supply pressurized fluid to the motor. At least one controller is configured to control the pump such that during at least a part of a saw recovery operation, the pump operates at a current pump displacement that results in a flow rate of hydraulic fluid through the saw pump that exceeds the first flow rate through the saw motor.

In another aspect, the hydraulic system includes a hydraulic motor operatively coupled to a saw disc of the saw head, and a hydraulic variable displacement pump operatively coupled to the hydraulic motor to supply pressurized fluid to the motor. A metering valve has an inlet coupled to an outlet of the pump and has an outlet coupled to an inlet of the motor. The metering valve has a valve member that is adjustable to vary flow area through the metering valve over a continuous range of flow areas, in order to regulate flow of hydraulic fluid from the pump to the motor by providing one of multiple flow areas from the continuous range of flow areas. A controller is configured to receive a saw speed input indicative of a rotational speed of the saw disc. The controller controls the metering valve so as to vary the flow area through the valve based upon the rotational speed of the saw disc, in order to vary flow from the pump to the motor.

In another aspect, the disclosure provides a control system for a hydraulically operated felling saw head. The control system has a hydraulic pump and motor arrangement, and a metering valve operatively coupled to the pump and motor arrangement. The metering valve includes a valve member that is adjustable to vary flow area through the metering valve over a continuous range of flow areas. The metering valve may accordingly regulate flow of hydraulic fluid from the pump to the motor based upon a current flow area of the metering valve. A controller is configured to receive a saw speed input signal and to execute a saw recovery operation in which the controller operates the metering valve to control the current flow area of the metering valve, and thereby control flow from the pump to the motor, based upon the saw speed input signal.

The details of one or more implementations of the disclosure are set forth in the accompanying drawings and the description below. Other features and advantages will become apparent from the description, the drawings, and the claims.

BRIEF DESCRIPTION OF THE DRAWINGS

Like reference numerals in the drawings indicate like components, parts, or operations.

DETAILED DESCRIPTION

The following describes one or more example implementations of the disclosed hydraulic system for a felling saw head, as shown in the accompanying figures of the drawings described briefly above.

Various control systems described herein may be discussed as "maintaining" system parameters, such as hydraulic pressure, at a particular value. As used herein, to "maintain" a parameter (e.g., pressure) at a target value may include controlling various devices to move the parameter towards the target value upon occurrence (or detection) of a deviation from the target value. In this regard, a system may be viewed as "maintaining" a parameter at a particular target value even as the parameter deviates above or below the target. For example, where a system is "maintaining" a pressure value at a target pressure, the actual pressure value may vary among a range of values above or below the target pressure, with the system controlling appropriate devices to return the pressure value to (or at least towards) the target pressure upon detection of deviation of the pressure value from the target pressure. In such a case, although the actual pressure value may move above and below the target pressure, the system may be viewed as maintaining the pressure value at the target pressure because the system is controlling various devices to return the actual pressure value to (or towards) the target pressure.

Also as used herein, a valve may be referred to as a "metering" valve if the valve may be controlled to provide various flow areas through the valve that are distributed over a continuous range of possible flow areas for the valve. This may stand in contrast, for example, to an on-off or cartridge valve, which may be controlled only to provide only a discrete number of non-zero flow areas (e.g., only one non-zero flow area), excluding leakage. For example, a metered valve may be controlled (i.e., "metered") by providing an electrical current (or hydraulic) command that moves a spool (or other valve member) of the valve from a fully open configuration to any number of partially open configurations. This may be useful, for example, in order to gradually reduce the flow area through the valve from a maximum flow area to one or more lesser flow areas.

In the discussion below, various references are made to the speed of certain components (e.g., saw discs). Unless otherwise noted, references to speed herein generally refer to rotational speed, as may be measured, for example, in revolutions per minute ("rpm").

Various references may also be made to "maximum" values for pump and motor flow rates, for pump and motor displacements, for flow areas through valves, and so on. It will be understood that the use of "maximum" in these contexts inherently refers to a maximum value determined by the characteristics of the relevant device, rather than an abstract concept of maximum quantity. For example, a "maximum" displacement for a pump may be viewed as the maximum displacement that is possible for the actual configuration of the pump. Likewise, a "maximum" flow area for a valve may be viewed as the maximum possible flow area through the valve, as the valve is actually configured.

Various discussion herein may focus on the example application of rotating a saw disc for a feller buncher, or for similar cutting machines. It will be understood, however, that such discussion is presented as an example only. The disclosed hydraulic system may be utilized for a variety of operations, and with a variety of powered machines.

As noted above, after a cutting operation (and at other times), saw discs for various cutting machines may need to be accelerated from rest (or other reduced rotational speed) to appropriate cutting speeds. For example, following a cutting operation (or in various other circumstances), a saw disc may need to be accelerated from a reduced speed (e.g., 0 rpm) to a target operating speed (e.g., a target cutting speed for a cutting operation). Generally, the actions and operations executed in order to accelerate the saw disc may be collectively referred to as a "recovery operation."

Because the operation of cutting machines may include a large number of separate cutting operations, it may be useful to minimize the time required to accelerate a saw disc to cutting speed during a recovery operation (i.e., the "recovery time" for the saw disc). The disclosed hydraulic system may provide this, and other, functionality.

In order to power rotation of a saw disc, including through multiple recovery operations, the disclosed hydraulic system may include a pressure source, a flow regulating valve, a motor for driving a saw disc, and one or more controllers for regulating operation of these (and other) components. For example, certain embodiments may include a variable displacement hydraulic pump, a variable displacement hydraulic motor receiving flow from the pump to drive a saw disc, and a metering valve (e.g., a solenoid-driven, continuously-adjustable, spool valve) disposed to regulate flow between the pump and the motor. Various controllers (e.g., electronic, electrohydraulic, hydraulic, or other control devices) may be utilized to control the displacement of the pump and motor, the position of a spool (or other valve member) of the metering valve, and various other system parameters. Through appropriate configuration of such a system (i.e., of a pump, motor, metering valve, and various controllers), the recovery time for a disc saw may be considerably reduced from that of other, known systems.

Generally, the disclosed hydraulic system may be viewed as providing improved recovery times for saw discs (and other devices) based upon factors including the metered regulation of flow from a pump to a motor by a metering valve, and the provision, by the pump, of flow rates exceeding those that correspond to a target operating speed (e.g., a target cutting speed) of the motor or an attached saw disc. With regard to pump flow rates, for example, configuring a pump to provide flow rates that could over-speed the saw disc may allow for improved acceleration of the saw disc during initial stages of a recovery operation. With regard to the metering valve, through metered operation of such a valve (e.g., via continuous control of flow area, in contrast to simple on-off operation), actual overspeeding of the saw disc may be avoided. For example, the valve may be fully opened during initial stages of a recovery operations, such that the elevated flow from a pump may result in relatively large acceleration of the saw disc. As the saw disc reaches an appropriate speed (e.g., a target cutting speed), the valve may then be metered to provide a reduced (but still non-zero) flow area, and thereby preventing overspeeding of the saw disc from the elevated pump flow rate.

With the example system noted above, at the start of a recovery operation, the controller (or controllers) may cause the motor and pump to operate at minimum displacement, and the metering valve may be placed in a fully open state, in order to provide a maximum flow area through the valve. Accordingly, flow from the pump may begin to drive the motor and the saw disc may begin to accelerate.

Due to its relatively high inertia, the saw disc may initially accelerate slowly. During this time, the metering valve may be maintained at a fully open state, in order to provide maximum flow from the pump to the motor and thereby maximize the torque applied by the motor to the saw disc.

Because of the initially slow acceleration of the saw disc (i.e., due to the large inertia of the saw), pump output pressure (and, correspondingly, motor inlet pressure) may increase somewhat rapidly. In certain embodiments, the pump may be configured as a pressure cut-off (or "PC") pump, and this noted increase in pump output pressure may accordingly cause the pump to reach the cut-off pressure relatively quickly. Once the cut-off pressure (or another benchmark pressure) is reached, the controller may begin to gradually increase the displacement of the pump. This may provide for increased flow through the system and, as the recovery operation progresses, the maintaining of a relatively high outlet pressure for the pump. In certain implementations, as the recovery operation progresses, the displacement of the pump may be continually increased until the pump reaches maximum displacement.

As noted above, the increase in pump outlet pressure may also cause the motor inlet pressure to increase. When the pressure at the motor inlet exceeds a prescribed pressure, the controller may shift the displacement of the motor to a maximum (or otherwise elevated) value. This prescribed pressure may be referred to herein as the "beginning of regulation" ("BOR") pressure. Shifting displacement of the motor to a maximum, once BOR pressure is reached, may provide for maximal torque at the motor, as may be appropriate for acceleration of a high-inertia body such as a saw disc.

When the motor is first shifted to maximum displacement, the increasing displacement of the pump (as discussed above) may result in relatively constant, elevated pressure at the motor inlet. (It will be understood that pressure drop due to line losses and the metering valve may result in a generally lower pressure at the motor inlet than at the pump outlet.) Eventually, however, the acceleration of the motor (and the saw disc) may result in a decrease in pressure at the motor inlet. As this pressure decreases back towards (and eventually reaches) the BOR pressure, the controller may regulate the displacement of the motor in order to maintain the motor inlet pressure at the BOR pressure. For example, as the pump displacement continues to increase and the pump outlet pressure is maintained at the pressure cap for the pump, the displacement of the motor may be generally decreased, in order to maintain the BOR pressure at the motor inlet. The portion of a recovery operation in which motor displacement is regulated based upon BOR pressure may be referred to as a motor regulation phase of the recovery operation and may generally contribute to shortened recovery times for a saw disc.

Once the saw disc is moving relatively freely, the motor may be returned to its minimum displacement, such that the motor may provide relatively high speed rotation to the saw disc and thereby maintain the relatively high rotational inertia of the saw disc. The pump, meanwhile, may be maintained at maximum displacement, in order to provide maximum output flow to drive the motor. For inertial saw discs, this portion of a recovery operation, in which the motor is at minimum displacement, may be referred to as a "coasting" phase of the recovery operation. Generally, such a coasting phase may follow (directly or indirectly) completion of a motor regulation phase.

Generally, a pump may be configured to operate at a target rotational speed, such as the target (e.g., most efficient) operating speed for an engine of the cutting machine. In certain embodiments, the flow rate provided by the pump at maximum displacement and at the target rotational speed (or other speed) may be somewhat larger than a flow rate through the motor that corresponds to a target operating (e.g., cutting) speed for the saw disc. This may be useful, for example, in order to provide elevated flow rates during acceleration of the saw disc (e.g., during a recovery operation). However, this flow-rate mismatch may also introduce the possibility of the pump overspeeding the saw disc. For example, once the saw disc has been accelerated to operating speed, continued routing of maximum flow from the pump (e.g., with the pump at maximum displacement) through the motor (e.g., with the motor at minimum displacement), may cause the motor to over-speed the saw disc. To avoid this possibility, in various embodiments, the noted metering valve may be controlled based upon an indicator of saw speed, in order to regulate the flow from the pump to the motor. For example, the metering valve may be opened to a maximum flow area during acceleration of the saw disc (e.g., during the motor regulation phase of a recovery operation), then metered to reduce the flow area through the valve as a speed sensor (or other device, such as a pressure sensor at the motor) indicates that the saw disc is approaching (or has reached) a target speed. In this way, the combination of a large flow-rate pump and a metering valve may allow for elevated acceleration of the saw disc while avoiding overspeeding once the saw disc reaches (or approaches) a target velocity.

A metering valve disposed as described above may also provide other benefits to the disclosed hydraulic system. For example, where a multi-position, metering valve is provided, a first position of the valve may correspond to metered flow from the pump to the motor, and a second position may correspond to metered flow from the pump to a hydraulic tank. With the valve in the first position, the valve may allow for continuously variable control of flow through the valve to the motor. As described above, this may allow for relatively rapid acceleration of the saw disc without overspeeding. In contrast, with the valve in the second position, the valve may allow hydraulic flow to be routed from the pump to other systems. This may be useful, for example, in order to supplement cooling of the cutting machine during operations such as overland travel. For example, where a machine is not actively cutting and additional coolant flow is needed for other systems, flow from a saw pump may be routed by a metering valve to a coolant reservoir or other tank. In certain embodiments, accordingly, operation of the valve in the second position may be based upon sensors relating to temperature of a coolant reservoir, or other aspects of the machine. In certain implementations, a third position may also be provided, corresponding to zero flow through the valve.

Figure 1:
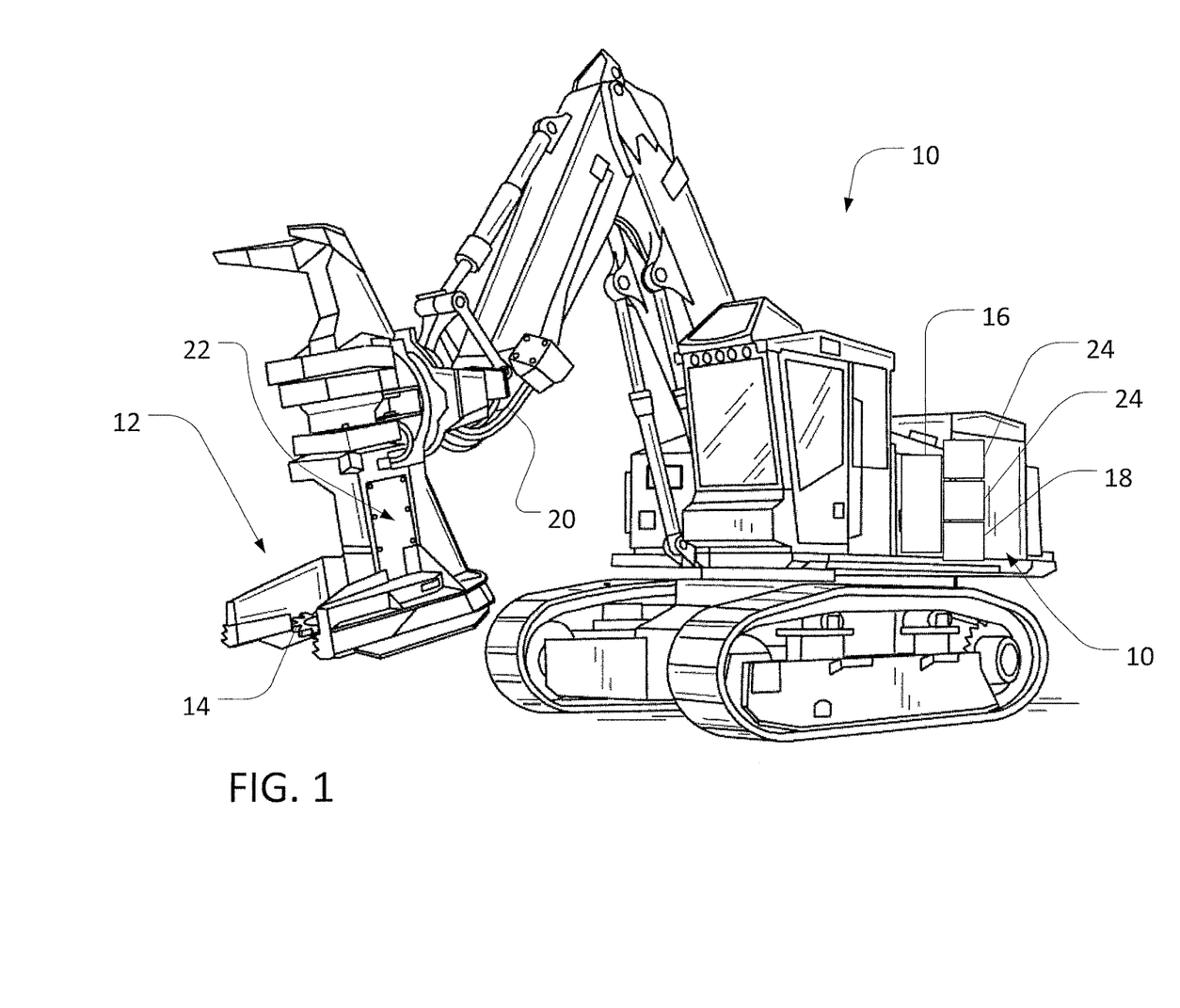
FIG. 1 is a simplified perspective view of an example machine, in the form of a tracked feller buncher, having a disc saw head and a hydraulic control system.
Figure 2:
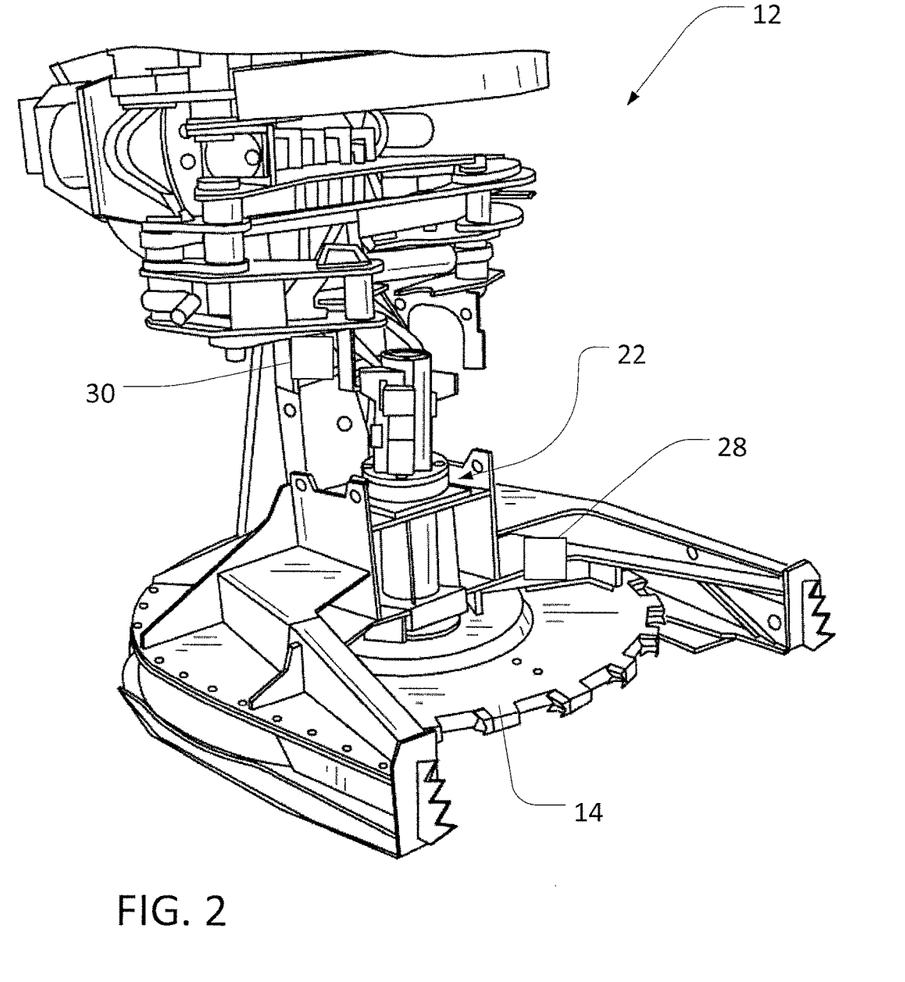
FIG. 2 is a perspective view of part of an example saw head of the feller buncher of FIG. 1.

As noted above, the disclosed hydraulic system may be utilized with regard to various powered machines with rotating components, including various machines for cutting and sawing operations. Referring to FIGS. 1 and 2, in certain embodiments, the disclosed system may be utilized for a feller buncher 10 with a saw head 12. Through various operations and control, as discussed herein, the disclosed system may be utilized to improve recovery time for a saw disc 14 of the saw head 12. It will be understood, however, that the disclosed system may also be utilized for other operations and with other machines.

Generally, the disclosed system, as implemented on the feller buncher 10, may include one or more pumps 16, which may be driven by an engine of the feller buncher 10 (not shown in FIG. 1). Flow from the pumps 16 may be routed through various valves 18 and various conduits 20 (e.g., flexible hoses) in order to power rotation of a motor 22. The motor 22, in turn, may power rotation of the saw disc 14. For example, an output spindle of the motor 22 (not shown in FIG. 1) may be connected to the saw disc 14 such that the spindle and the saw disc 14 rotate with a 1:1 (or other) speed ratio.

In various embodiments, the pumps 16 (or a subset thereof) may be configured as variable displacement pumps and the motor 22 may be configured as a variable displacement motor. In certain embodiments, a particular one (or more) of the pumps 16 may be configured to provide pressurized flow to the motor 22, while others of the pumps 16 may be configured to provide pressurized flow to other systems (e.g., drive systems for tracks of the feller buncher 10). Likewise, a particular one (or more) of the valves 18 may be configured to regulate flow between the pumps 16 and the motor 22, while others of the valves 18 may be configured to regulate flow to other devices.

In various embodiments, one or more of the valves 18 may be configured as a metering valve, such that a flow area through the valve may be varied over a continuous range of flow areas (e.g., rather than simply switched between open and closed configurations, as with an on-off or cartridge valve). As described in greater detail below, for example, one of the valves 18 may be configured as a multi-position, metering spool valve, which may be controlled to provide a range of flow areas for flow from one of the pumps 16 to the motor 22. Other configurations may also be possible. In various embodiments, one or more other valves (not shown) may alternatively (or additionally) be disposed at other locations on the feller buncher 10.

A controller 24 (or multiple controllers) may be provided, for control of various aspects of the operation of the disclosed hydraulic system (and the operation of the feller buncher 10, in general). The controller 24 (or others) may be configured as a computing device with associated processor devices and memory architectures, as a hard-wired computing circuit (or circuits), as a programmable circuit, as a hydraulic, electrical or electro-hydraulic controller, or otherwise. As such, the controller 24 may be configured to execute various computational and control functionality with respect to the feller buncher 10 (or other machinery). In certain embodiments, the controller 24 may be configured to receive input signals in various formats (e.g., as hydraulic signals, voltage signals, current signals, and so on), and to output command signals in various formats (e.g., as hydraulic signals, voltage signals, current signals, mechanical movements, and so on). In certain embodiments, the controller 24 (or a portion thereof) may be configured as an assembly of hydraulic components (e.g., valves, flow lines, pistons and cylinders, and so on), such that control of various devices (e.g., pumps or motors) may be effected with, and based upon, hydraulic, mechanical, or other signals and movements.

The controller 24 may be in electronic, hydraulic, mechanical, or other communication with various other systems or devices of the feller buncher 10 (or other machinery). For example, the controller 24 may be in electronic or hydraulic communication with various actuators, sensors, and other devices within (or outside of) the feller buncher 10, including various devices associated with the pump 16, valves 18, conduits 20, motor 22, and saw disc 14. The controller 24 may communicate with other systems or devices (including other controllers) in various known ways, including via a CAN bus (not shown) of the feller buncher 10, via wireless or hydraulic communication means, or otherwise. An example location for the controller 24 is depicted in FIG. 1. It will be understood, however, that other locations are possible including other locations on the feller buncher 10, or various remote locations.

Various sensors may also be provided. For example, various sensors 26 (e.g., pressure, flow or other sensors) may be disposed near the pumps 16 and valves 18, or elsewhere on the feller buncher 10). In certain embodiments, various sensors may be disposed near the saw head 12. For example, referring specifically to FIG. 2, a speed sensor 28 may be disposed near the saw disc 14, in order to measure rotational speed of the saw disc 14, and a pressure sensor 30 may be disposed near the motor 22 (e.g., at an inlet or outlet of the motor 22).

Figure 3:
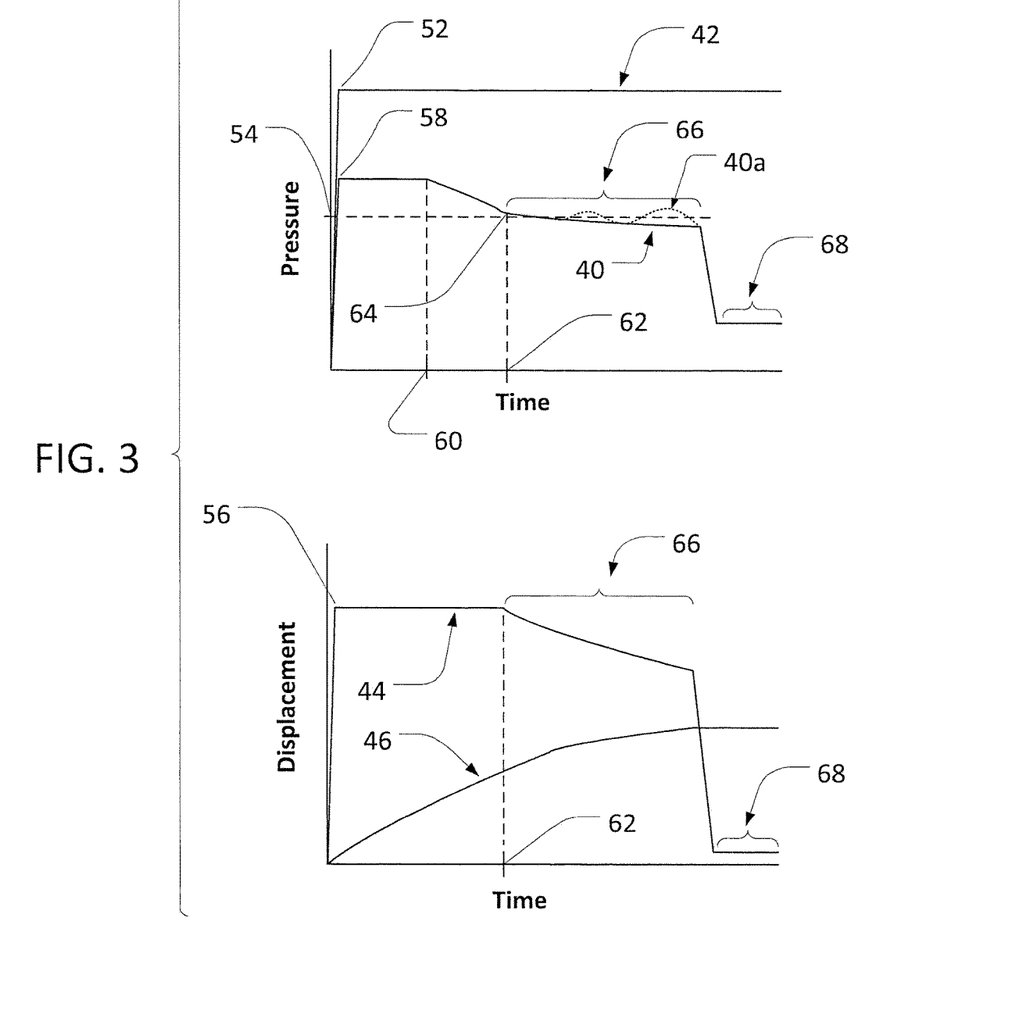
FIG. 3 is a graphical representation of pressure and displacement profiles over time, for a recovery operation for the feller buncher of FIG. 1.
Figure 4:
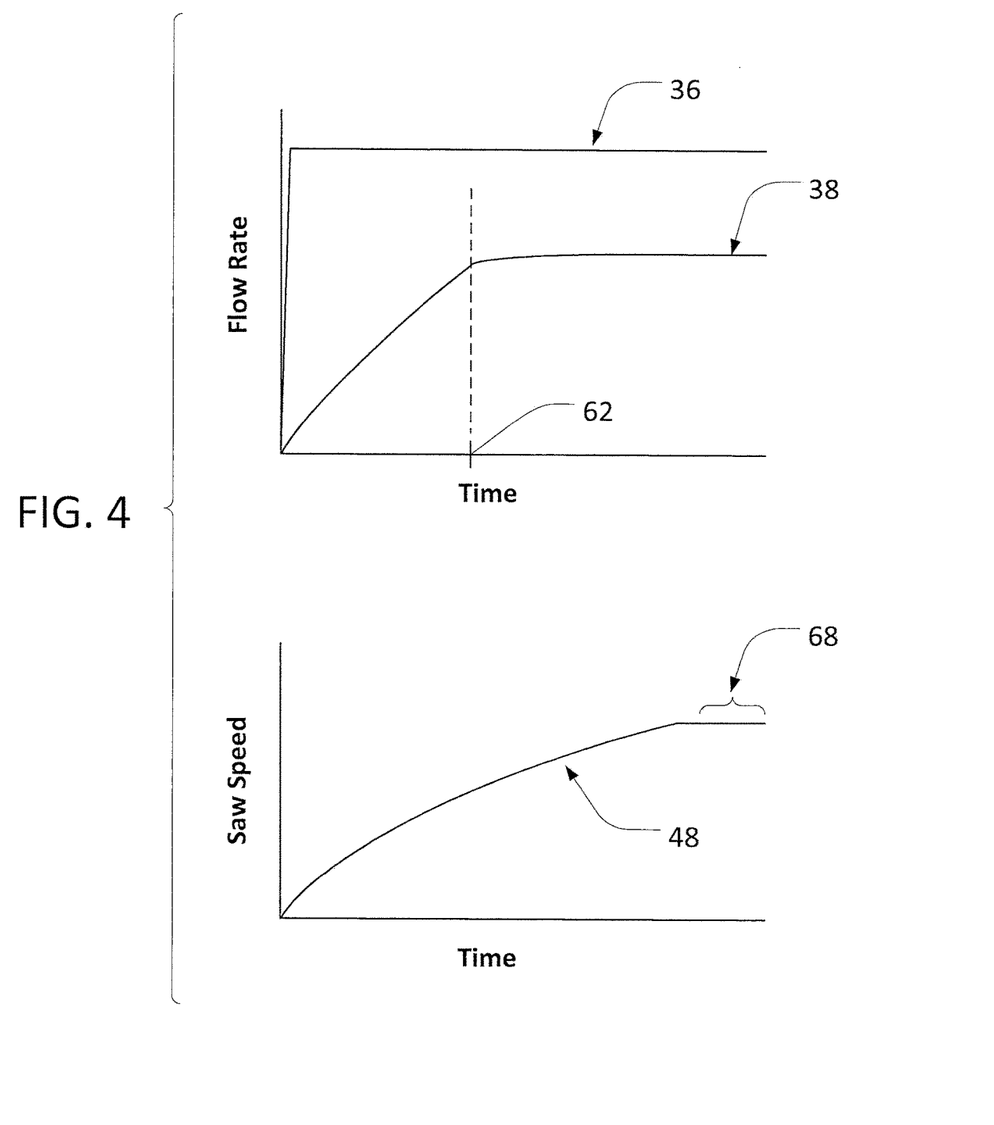
FIG. 4 is a graphical representation of flow rate and saw speed profiles over time, for the recovery operation for the feller buncher of FIG. 1.

The various components noted above (and others) may be utilized to execute a recovery operation for the saw disc 14, which may exhibit a generally shorter recovery time than is possible with known systems. Referring also to FIGS. 3 and 4, a set of graphs are presented representing various system pressures, motor and pump displacements, and saw speeds, with respect to the same time axis, for an example recovery operation.

In FIG. 3, the upper graph represents example system hydraulic pressures, with a lower profile 40 representing inlet pressure at the motor 22, and an upper profile 42 representing outlet pressure at a corresponding one of the pumps 16. The lower graph represents example motor and pump displacement, along a corresponding time axis, with an upper profile 44 representing displacement of the motor 22, and a lower profile 46 representing displacement of the relevant pump 16. In FIG. 4, along the same time axis as in FIG. 3, the upper graph represents example flow rates at an outlet of the pump 16 with the profile 36, and example flow rates at an inlet of the motor 22 with the profile 38. The lower graph in FIG. 4 represents example rotational speeds of the saw disc 14 with the profile 48, also along the same time axis as in FIG. 3. It will be understood that the scales and profiles of the graphs of FIGS. 3 and 4 are presented as examples reflecting a particular control strategy with particular devices, and that other pressure and displacement profiles may be possible. As depicted, the origin of the graphs is intended to indicate the start of a particular recovery operation and may not necessarily represent a "zero" time for ongoing operation of the feller buncher 10. Likewise, the origin may not necessarily represent a value of zero for the various ordinate parameters (i.e., pressure, displacement, flow rate and speed).

At the start of the depicted recovery operation, the controller 24 (or a general default setting of the system) may cause the motor 22 and the relevant pump 16 to operate at minimum displacement. The controller 24 may also control a relevant one of the valves 18 to a fully open position, such that flow area through the relevant valve 18, from the pump 16 to the motor 22, is maximized. Under this configuration, as seen in the upper graph of FIG. 3, the outlet pressure at the pump 16 (i.e., as shown by the profile 42) and the inlet pressure at the motor 22 (i.e., as shown by the profile 40)

may rapidly increase. Correspondingly, due to the flow from the pump 16 (i.e., as depicted in the profile 36 of FIG. 4), and the pressure rise at the inlet of the motor 22, the saw disc may begin to accelerate (i.e., as shown by the profile 46).

As depicted, the (local) maximum pressure at the motor 22 may be somewhat less than the (local) maximum pressure at the pump 16 (e.g., the cut-off pressure of a PC pump), given the pressure drop over the intervening valve 18 and conduits 20. In certain embodiments, it may be useful to set the BOR pressure 54 for the motor 22 equal to between approximately 90% and 95% of the PC pressure for the pump 16. It will be understood, however, that other settings may be possible.

Because of the slow acceleration of the saw disc 14, pump output pressure (and, correspondingly, motor inlet pressure) may increase relatively quickly. In certain embodiments, where the pump 16 is configured as a PC pump, this noted increase in pump output pressure may quickly reach a cut-off pressure 52. Once the cut-off pressure 52 is reached, the controller 24 may begin to gradually increase the displacement of the pump 16. This may provide for increased flow through the system (as depicted in the profiles 36 and 38 of FIG. 4) and, as the recovery operation progresses, the maintaining of a relatively high outlet pressure for the pump. In certain implementations, as the recovery operation progresses, the displacement of the pump 16 may be continually increased until the pump 16 reaches maximum displacement. The maximum displacement may then be maintained for the duration of the recovery operation and thereafter.

In certain embodiments, the pump 16 may be a pressure cut-off load-sensing ("PCLS") pump, with the controller 24 controlling the displacement of the pump 16 based upon a sensed downstream pressure (e.g., a pressure at the outlet of the valve 18). This may be useful, for example, in order to maintain a relatively constant flow rate (i.e., as depicted in the profile 36) from the pump 16 across the valve 18 (and, thereby, to the motor 22). It will be understood that the flow rate at the inlet to the motor 22 (i.e., as depicted in the profile 38) may be generally less than the flow rate at the outlet of the pump 16, due to system losses and the regulation of the flow by the valve 18 (as discussed in greater detail below).

As noted above, at the start of the recovery operation, the pump outlet pressure and the motor inlet pressure may rapidly increase. When the pressure at the motor inlet exceeds a prescribed pressure, such as BOR pressure 54, the controller 24 may control the motor 22 to operate the motor 22 at a maximum displacement 56. This may, as noted above, provide for maximal torque at the motor, as may be appropriate for acceleration of a high-inertia body such as the saw disc 14. Due to the continued inertial resistance of the saw disc 14, the pressure at the motor inlet may continue to rise above the BOR pressure 54, until it reaches a maximum inlet pressure 58. As noted above, due to pressure losses between the pump 16 and motor 22, the maximum inlet pressure 58 may be somewhat less than the maximum pump pressure 52.

When the motor 22 is first shifted to the maximum displacement 56, the increasing displacement of the pump 16 (i.e., as shown on profile 46) may result in relatively constant, elevated pressure at the motor inlet. Eventually, however, the acceleration of the motor 22 (and, correspondingly, of the saw disc 14) may result in a decrease in pressure at the motor inlet. This can be seen to occur, in the upper graph of FIG. 3, at a time 60. As the motor inlet pressure decreases back towards (and eventually reaches) the BOR pressure 54, the controller 24 may regulate the displacement of the motor 22 in order to maintain the motor inlet pressure near the BOR pressure 54. As noted above, this may be referred to as the motor regulation phase of a recovery operation and may be conducive to relatively short recovery times.

In certain embodiments, the controller 24 may begin to regulate the displacement of the motor 22 when the falling motor pressure reaches a pressure slightly above the BOR pressure 54 (e.g., 10 bar above the BOR pressure). As depicted in FIG. 3, for example, at a time 62, the pressure at the motor inlet may have reached a pressure 64 that is only slightly above the BOR pressure 54. As can be seen in the motor displacement profile 44, this time 62 may accordingly correspond to the start of a motor regulation phase 66 and, correspondingly, to the start of a controlled decrease in the motor displacement in order to maintain the motor inlet pressure at the BOR pressure 54.

As depicted in the upper graph of FIG. 3, and also discussed above, maintaining motor inlet pressure at the BOR pressure 54 may not necessarily include the fixing of the motor inlet pressure exactly at the BOR pressure 54. As depicted in the profile 40 of FIG. 3, for example, maintaining of motor inlet pressure at the BOR pressure 54 may include adjusting motor displacement downward to effect a relatively slow decrease of motor inlet pressure below the BOR pressure 54, rather than a freezing of the motor inlet pressure at the BOR pressure 54. In certain implementations, other pressure profiles may result during the motor regulation phase 66. For example, the actual motor inlet pressure may oscillate (regularly or irregularly) about the BOR pressure 54 as depicted in example pressure profile 40a, rather than decreasing steadily from the start of the phase 66.

Once the saw disc 14 is rotating relatively freely (e.g., due to the large rotational inertia of the saw disc 14 once accelerated), the motor 22 may be returned to its minimum displacement, such that the motor 22 may provide relatively high speed (but low torque) rotation to maintain the speed of the saw disc 14. Because the saw disc 14 may spin during this time due, in significant part, to its inertia, this portion of a recovery operation (e.g., including the return of the motor 22 to its minimum displacement) may be characterized as a coasting phase. As can be seen in FIG. 4, a coasting phase 68 may correspond to a relatively constant saw speed (i.e., as represent on the profile 46), a minimum motor displacement (i.e., as represented on the profile 44), and a maximum pump displacement (i.e., as represented on the profile 46). Also as depicted, the coasting phase 68 generally follows the motor regulation phase 66, and may be viewed as marking the end phase of a particular recovery operation.

Although, in the example recovery operation depicted in FIG. 3, the displacement for the motor 22 is depicted as falling below the displacement of the pump 16 during the coasting phase 68, other configurations may be possible. For example, in certain embodiments, the minimum displacement of the motor 22 during the coasting phase 68 (and at other times) may be equal to, or larger than, the maximum displacement of the pump 16.

After engagement of the saw disc 14 for cutting, or other events that result in decreased saw speed, a subsequent recovery operation may then be executed. In certain implementations, control of various components by the controller 24 for each successive recovery operation may generally follow the profiles depicted in FIG. 3. In other embodiments, other control strategies may be utilized, resulting in other pressure, displacement and speed profiles.

Consistent with the other discussion above, it will be noted that the actual operational profiles of pressure, displacement and saw speed may vary somewhat from the profiles depicted in FIGS. 3 and 4. In certain implementations, system transients and other phenomena may result in profiles that do not exhibit the relatively smooth profiles of FIGS. 3 and 4. For example, in the transition from the motor regulation phase 66 to the coasting phase 68, the pressure at the motor 22 may actually dip below the final pressure, before returning upwards to the relatively constant pressure profile shown. Likewise, as noted above, the actual motor pressure may oscillate (or otherwise vary) with respect to the profile depicted, during the motor regulation phase 66 or at other times.

As also noted above, in certain embodiments, the flow rate from the pump 16 with the pump 16 at maximum displacement (and at a target rotational speed, such as a target operating speed for an engine of the cutting machine) may be somewhat larger than the flow rate through the motor 22 that corresponds to a target operating (e.g., cutting) speed for the saw disc 14. Referring again to FIGS. 1 and 2, for example, where the pump 16 is at maximum displacement and is driven by an engine (not shown in FIG. 1) of the feller buncher 10 at a target rotational speed (e.g., the target operating speed for the engine, such as 1850 rpm), the pump 16 may provide a particular maximum-displacement flow rate at the pump outlet. At a target cutting (or other operating) speed of the saw disc 14, however, a corresponding flow rate through the motor 22 (e.g., with the motor 22 at minimum displacement) may be less than the maximum-displacement flow rate through the pump 16 noted above. Accordingly, routing of maximum flow from the pump 16 directly to the motor 22, without metering of the flow, could result in overspeeding of the saw disc 14 (i.e., in a rotation of the saw disc 14 at a speed that is higher than the target speed).

Despite this issue, however, it may be useful to configure the pump 16 to provide relatively large flow rates to the motor 22. During a recovery operations, for example, larger flow rates to the motor 22 may provide for faster acceleration of the saw disc 14 and, accordingly, shorter recovery time. It may be useful, accordingly, to configure the relevant valve 18 as a metering valve. In this way, when flow rates at the outlet of the pump 16 could result in overspeeding of the saw disc 14, the flow area of the valve 18 may be reduced (e.g., metered gradually downward over a continuous range of flow areas) in order to reduce the flow rates at the inlet of the motor 22. Further, when overspeeding is not expected (e.g., at the beginning of a recovery operation), the valve 18 may be metered to a fully open (or other) position in order to increase the acceleration of the saw disc 14. For example, during a motor regulation phase 66 of a recovery operation, the valve 18 may be controlled to a fully open position, such that maximum flow rate is provided from the pump 16 to the motor 22 and acceleration of the saw disc 14 is maximized. When the recovery operation enters the coasting phase 68 (or nears the coasting phase 68), the valve 18 may then be metered partly closed from its fully open position, in order to reduce the flow rate from the pump 16 (which may be at maximum displacement) to the motor 22 (which may be at, or approaching, minimum displacement).

Various devices may be utilized to provide input for control of such metering of the valve 18. In certain embodiments, for example, the speed sensor 28 may provide a saw speed input to the controller 24, and the metering of the valve 18 may be controlled based upon the saw speed input. For example, when the speed sensor 28 indicates that the saw disc 14 is at a coasting speed, the controller 24 may cause a partial closing of the valve 18, such that flow from the pump 16 through the valve 18 to the motor 22 is reduced.

In certain embodiments, other sensors may be utilized. For example, the pressure sensor 30 may provide a motor pressure signal to the controller 24, which may be correlated, for a given system, to a current operating speed of the saw disc 14. The flow area through the valve 18 may then be adjusted, as appropriate.

In certain implementations, the valve 18 may be metered to reduce the flow area through the valve 18 based upon the saw disc 14 approaching a target operating (e.g., cutting) speed. For example, as the speed sensor 28 or pressure sensor 30 provides signals indicating that the speed of the saw disc 14 is approaching (e.g., but has not yet reached) a coasting speed, the controller 24 may gradually reduce the flow area through the valve 18 from a maximum area to a reduced area. Such a gradual reduction in flow area may, for example, provide for a smoother transition from a motor regulation phase to a coasting phase of a recovery operation (e.g., by providing a more gradual decrease in saw disc acceleration as the operation moves into the coasting phase). The controller 24 may determine that the speed of the saw disc 14 is approaching (or has attained) the coasting speed (or other target speed) by, for example, comparing current speed information for the saw disc 14 (e.g., from the sensor 28 or 30) with the coasting speed (or values relating thereto), in various known ways.

Figure 5:
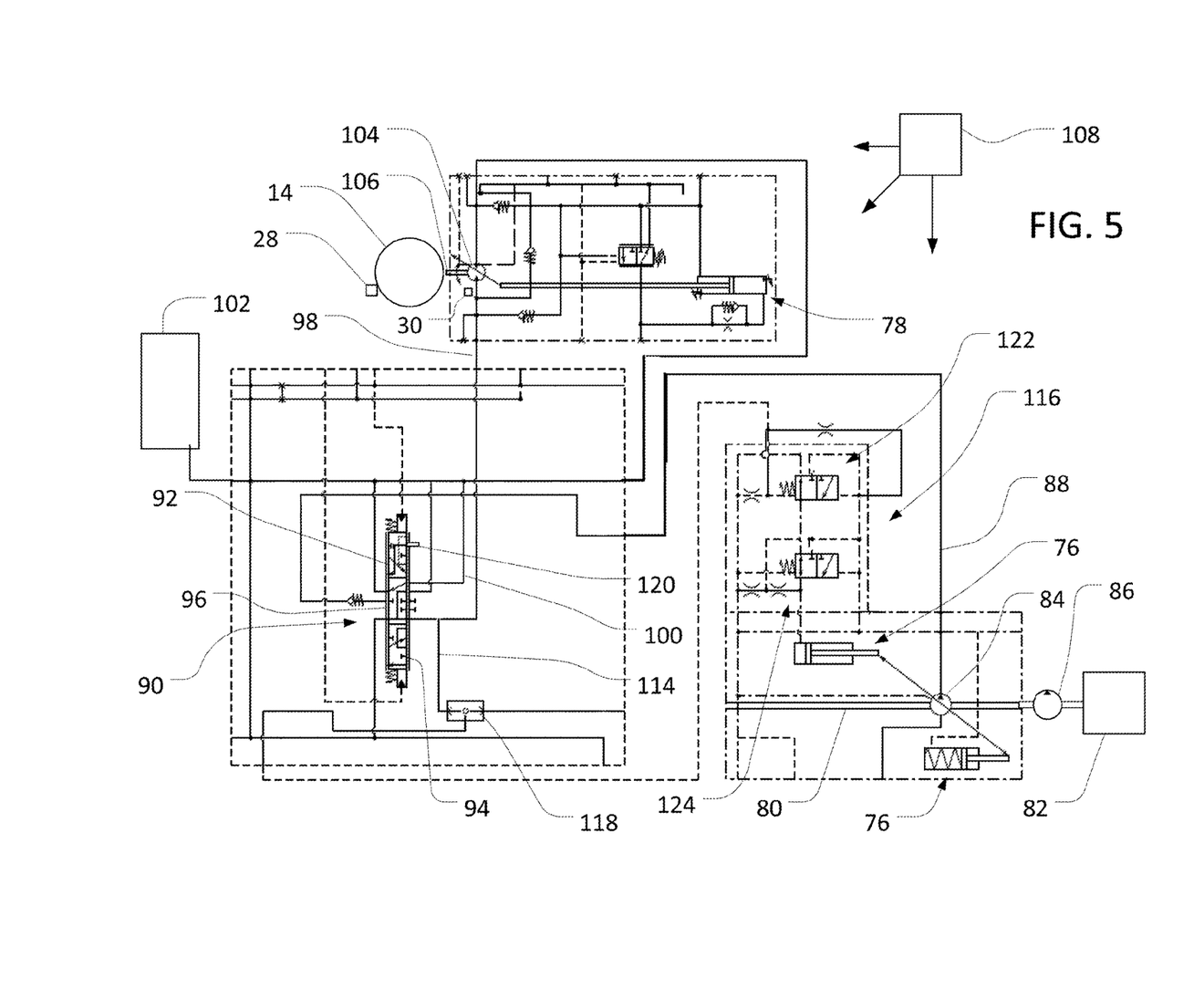
FIG. 5 is a simplified schematic view of an example hydraulic control system for the feller buncher of FIG. 1.

Referring also to FIG. 5, an example hydraulic system is depicted, which may provide the various functionality described above (as well as various other benefits). Various components depicted in FIG. 5 (e.g., pumps, motors, valves, controllers, and so on) may generally correspond in functionality to similarly named components discussed above (e.g., the pumps 16, motor 22, valves 18, controller 24, and so on of FIGS. 1 and 2), although different numbering may be utilized in certain cases. In various embodiments, the arrangement depicted in FIG. 5 may form a subsystem of a larger hydraulic system for the feller buncher 10 (or another machine). As such, it will be understood that various devices, flow lines, connections, and so on may be utilized in combination with the arrangement of FIG. 5, although such devices, flow lines, connections, and so on may not be depicted in FIG. 5.

As depicted, a drive shaft 80 extends from an engine 82 of the feller buncher 10 to a hydraulic saw pump 84, such that the saw pump 84 may be driven by the rotation of the engine 82. In various embodiments, other pumps (and other devices) may also be driven by the engine 82, including via the drive shaft 80. As depicted, for example, a main pump 86 is configured also be driven by the engine 82 via the drive shaft 80. The main pump 86 may be a distinct device from the saw pump 84 and may be generally configured to provide hydraulic flow to different devices than the saw pump 84, including via distinct, hydraulically isolated flow paths. The main pump 86 may be controlled by an electro-hydraulic torque controller based on engine speed. During operation of the feller buncher 10, it may be useful to operate the engine 82 at a relatively constant speed (e.g., between 1800 and 1900 rpm), such that the saw pump 84 and the main pump 85 generally rotate a relatively constant speed. It will be understood, however, that other operating modes may be possible.

The displacement of the saw pump 84 may be controlled in various ways. In certain implementations, displacement of the saw pump 84 may be varied based upon electronic or hydraulic signals from a controller (e.g., an electrical or hydraulic controller 108, or another device). In certain implementations, displacement of the saw pump 84 may alternatively (or additionally) be controlled by the mechanical action of a piston and cylinder arrangement 76, as actuated based upon hydraulic, electrical, or other signals.

Generally, flow from the saw pump 84 may be utilized to drive rotation of a hydraulic saw motor 104 and, thereby, of the saw disc 14 (e.g., via a spindle 106). In certain embodiments, the saw pump 84 may be a dedicated pump for operating the saw motor 104. In certain embodiments, flow from the saw pump 84 may be utilized (e.g., selectively) to operate various other devices (not shown).

As with the saw pump 84, the displacement of the saw motor 104 may be controlled in various ways. In certain implementations, displacement of the saw motor 104 may be varied based upon electronic or hydraulic signals from a controller (e.g., the controller 108, or another device). In certain implementations, displacement of the saw motor 104 may alternatively (or additionally) be controlled by the mechanical action of a piston and cylinder arrangement 78, as actuated based upon hydraulic, electrical, or other signals. In certain implementations, as detailed herein, the saw motor 104 may operate at a rotational speed that is relatively independent of the operating speed of the engine 82.

Flow from the saw pump 84 may be routed through a flow line 88 (or other conduit) to a metering valve 90, with the metering valve 90 accordingly controlling flow from the saw pump 84 to the saw motor 104 (as described in greater detail below). Various configurations for the metering valve 90 may be possible, in order to provide for controllable selection of a flow area through the valve 90 from a continuous range of possible flow areas. As depicted, for example, the valve 90 is a eight-way, three-position, proportional control valve, which may be controlled with hydraulic or electrical pilot command signals (e.g., as provided by the controller 108, or another device). A first (upper, as depicted) position 92 of the valve 90 may correspond to metering of hydraulic flow from the saw pump 84 through a flow line 98 to the saw motor 104, in order to power rotation of the saw disc 14 (e.g., via a spindle 106). A second (lower, as depicted) position 94 of the valve may correspond to a metering of hydraulic flow from the saw pump 84 through a flow line 100 to a hydraulic tank 102 (e.g., a coolant reservoir). A third (center, as depicted) position 96 may correspond to a blocking of hydraulic flow from the saw pump 84 with regard to both the tank 102 and the saw motor 104.

As noted above, the valve 90 may be configured such that the flow area through the valve may be controllably metered to any number of flow areas along a continuous range of flow areas. With regard to the disclosed system, this may allow flow from the saw pump 84 to the saw motor 104 to be controllably reduced, as appropriate, via control of the valve 90. In turn, this may allow the saw pump 84 to be configured to provide a potentially overspeeding flow, with respect to the saw motor 104 and saw disc 14, with a later reduction in flow rate, effected via control of the valve 90. Accordingly, through control of the valve 90, total recovery time for a recovery operation may be shortened, while overspeeding of the saw disc 14 is avoided.

In certain implementations, for example, the saw pump 84 may be operated with a potentially overspeeding flow rate during acceleration of the saw disc 14 (e.g., during the motor regulation phase 66 of FIG. 3), with the valve 90 being commanded to a fully open state (for the first valve position 92). As the saw disc 14 approaches a target operating (e.g., cutting) speed, the valve 90 may then be controlled to reduce the flow area (still with regard to the first valve position 92), such that overspeeding of the saw disc 14 is avoided.

The approach to (or attainment of) a target operating (e.g., cutting) speed by the saw disc 14 may be determined in various ways. In certain embodiments, the controller 108 may be configured to receive a signal indicating a current saw disc speed, and, based on this signal, compare the current speed of the saw disc 14 with the target operating speed.

The current speed of the saw disc 14, upon which the metering of the valve 90 may be based, may be measured (and signaled to the controller 108) in various ways. In certain embodiments, as noted above, the speed sensor 28 may be disposed to measure the actual speed of the saw disc 14. Saw speed signals from the sensor 28 may then, for example, be routed to the controller 108 for comparison with a target speed and, based upon the comparison, the controller 108 may issue appropriate control commands to the valve 90. In certain embodiments, other sensors may be utilized, such that saw disc speed may be derived (e.g., from correlations, look-up tables, or modeling functions) rather than measured directly. For example, the pressure sensor 30 may measure inlet (or other) pressure at the saw motor 104 and provide a corresponding motor pressure input signal to the controller 108. Based upon the motor pressure input signal, the controller 108 may then determine a current speed of the saw disc 14 (e.g., based upon correlation of pressure measurements at the sensor 30 with the current operating speed of the saw disc 14), compare the current speed with a target speed, and implement corresponding control for the valve 90.

The valve 90 may be configured to include various other features, such as anti-cavitation valves, port relief valves, and so on. In certain embodiments, a mechanical (or other) flow limiter 120 may be provided. The flow limiter 120 may, for example, be selectively utilized to mechanically (or otherwise) limit the movement of the spool (or other valve member) of the valve 90, and thereby mechanically limit the flow area through the valve 90 to a predetermined maximum value. In certain embodiments, this may provide a useful alternative (or supplement) to control of the flow area through the valve 90 via an electronic or hydraulic controller (e.g., the controller 108). For example, in the event of a failure of the controller 108, an actuating solenoid for the valve 90, or other relevant components, the mechanical spool limiter 120 may help to avoid overspeeding of the saw disc 14, even with the saw pump 84 at maximum displacement, by mechanically limiting the flow area through the valve 90.

The saw pump 84 may be configured to operate with load-sensing control, in order to provide appropriate flow rates through the valve 90 despite varying pressure at the inlet of the saw motor 104. As depicted, for example, a flow line 114 may connect an outlet of the valve 90, via a shuttle connection 118, to a load-sensing control assembly 116 (i.e., a load-sensing controller). By way of the flow path provided by the flow line 114, the outlet pressure at the valve 90 may be utilized by the control assembly 116 in order to regulate the displacement of the saw pump 84. This may be useful, for example, in order to maintain a relatively constant flow rate through the valve 90 and, thereby, a relatively constant flow rate at the inlet of the saw motor 104.

Various load-sensing controls may be utilized for the saw pump 84. As depicted, for example, the control assembly 116 includes a pair of valve assemblies 122 and 124. The first valve assembly 122 is configured to provide a pressure margin to the load-sense pressure signal from the flow line 114, as may be useful to compensate for pressure losses through the various flow lines and devices of the depicted system. For example, the valve assembly 122 may be configured to increase the pressure signal from the flow line 114 by a particular threshold values between 250 and 350 psi. The second valve assembly 124 is configured to provide a pre-set pressure cut-off for the saw pump 84.

In certain embodiments, the shuttle connection 118 may facilitate routing of hydraulic flow from the saw pump 84 to other devices (not shown)). This may be useful, for example, in order to utilize the pumping power of the saw pump 84 and the control of the valve 90 to power additional (or alternative) devices (not shown) and functionality.

Still referring to FIG. 5, an example recovery operation for the saw disc 14 may begin with the saw pump 84 and the saw motor 104 at minimum displacement (e.g., based on default settings of the saw pump 84 and saw motor 104) and the valve 90 metered to a fully open configuration of the first position 92. As flow from the saw pump 84 increases pressure in the system (e.g., as measured via the flow line 114), the load-sensing control assembly 116 may gradually increase displacement of the saw pump 84 (e.g., via the control arrangement 76) in order to maintain appropriate system flow rates. Further, once the system pressure exceeds a BOR pressure for the saw motor 104, the saw motor 104 may be disposed at maximum displacement (e.g., via the control arrangement 78).

As the saw motor 104 (and the saw disc 14) continue to accelerate, the pressure at the inlet to the saw motor 104 (e.g., as may be sensed by the pressure sensor 30, or via hydraulic components of the control arrangement 78) may begin to decrease. Once this pressure falls to within a predetermined range of the BOR pressure (e.g., to 10 bar about the BOR pressure), the displacement of the saw motor 104 may be decreased (or otherwise controlled) in order to generally maintain the BOR pressure. Meanwhile, through the load-sensing regulation discussed above, the displacement of the saw pump 84 may continue to be increased until it reaches, and is maintained at, a maximum value.

As the saw disc 14 approaches (or reaches) a coasting speed, the pressure at the saw motor 104 may fall significantly below the BOR pressure and the displacement of the saw motor 104 may be correspondingly reduced to a minimum. This may allow for relatively efficient maintaining of the relatively high coasting speed of the saw disc 14. At minimum displacement of the saw motor 104, however, the relatively large flow rates provided by the saw pump 84 at maximum displacement may tend to over-speed the saw disc 14. Accordingly, as the saw disc 14 approaches (or reaches) the coasting speed, the valve 90 (still in the first position) may be metered to provide a reduced flow area through the valve (and between the saw pump 84 and the saw motor 104). This may reduce the flow rate from the saw pump 84 to the saw motor 104 and thereby avoid overspeeding of the saw disc 14.

In certain implementations, the valve 90 may be metered relatively quickly between a maximum flow area and a reduced flow area. For example, the controller 108 may command a relatively instantaneous metering of the valve 90 to a final reduced flow area upon receiving a saw speed input signal from the sensor 16 (or the pressure sensor 30, or another device) that indicates that the saw disc 14 has reached a target (e.g., cutting or coasting) speed. In certain implementations, the valve 90 may be metered more gradually. For example, the controller 108 may command a gradually metering of the valve 90 to a final reduced flow area based upon receiving a saw speed input signal from the sensor 16 (or the pressure sensor 30, or another device) that indicates that the saw disc 14 is approaching (e.g., but has not yet reached) a target (e.g., cutting or coasting) speed. This may be useful, for example, in order to provide for a relatively smooth deceleration of the saw disc 14, as the saw disc 14 approaches its target speed.

In certain embodiments, the valve 90 may be replaced (or supplemented) by other flow control devices. For example, a different (e.g., non-metered) valve may be utilized in place of the valve 90, and the displacement of the saw pump 84 or the saw motor 104 may be controlled (e.g., electronically, by the controller 108) based upon the current speed of the saw disc 14 (e.g., as measured via one of the sensor 28 or 30).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the any use of terms "comprises" and/or "comprising" in this specification specifies the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A hydraulic system for a felling saw head, comprising:
a hydraulic variable displacement saw motor operatively coupled to a saw disc of the saw head and configured to operate the saw disc at a target operating speed;
a hydraulic variable displacement saw pump operatively coupled to the saw motor to supply pressurized hydraulic fluid to the saw motor;
at least one controller configured to control the saw pump; and
a metering valve operatively coupled to the saw pump and the saw motor and to the at least one controller, the metering valve being configured to provide a current flow area for a flow of the hydraulic fluid through the metering valve, selected from a continuous range of flow areas through the metering valve, in order to regulate the flow of the hydraulic fluid from the saw pump to the saw moor to prevent the saw motor from operating the saw disc above the target operating speed, wherein the metering valve is a spool valve having at least two valve positions, and wherein in a first valve position an output of the metering valve connects to the saw motor and in a second valve position the output of the metering valve connects to a hydraulic tank;
wherein, during at least a part of a saw recovery operation, the at least one controller controls the saw pump to operate the saw pump at a pump displacement that supplies the hydraulic fluid to the saw motor corresponding to operating the saw disc above the target operating speed.

2. The system of claim 1, wherein the metering valve includes a third valve position in which the output of the metering valve is blocked from the saw motor and the hydraulic tank.

3. The system of claim 1, wherein the at least one controller is configured to vary the pump displacement of the saw pump based upon a load pressure measured at a point downstream of the metering valve, with respect to the flow of the hydraulic fluid from the saw pump.

4. The system of claim 1, wherein the at least one controller is configured to:
receive at least one of a saw motor pressure signal and a saw speed signal; and
control the metering valve to provide the current flow area, and thereby control the flow from the saw pump to the saw motor, based upon the at least one of the saw motor pressure signal and the saw speed signal.

5. The system of claim 1, wherein the at least one controller is configured to receive a saw motor pressure signal and vary a displacement of the saw motor based upon a saw motor pressure signal.

6. The system of claim 1, further including a main hydraulic system having a main hydraulic pump distinct from the saw pump.

7. A hydraulic system for a felling saw head, comprising:
a hydraulic motor operatively coupled to a saw disc of the saw head;
a hydraulic variable displacement pump operatively coupled to the hydraulic motor to supply pressurized hydraulic fluid to the motor;
a metering valve having an inlet coupled to an outlet of the pump and having an outlet coupled to an inlet of the motor, the metering valve having a valve member that is adjustable to vary a flow area for a flow of the hydraulic fluid through the metering valve over a continuous range of flow areas, in order to regulate the flow of the hydraulic fluid from the pump to the motor; and
a controller configured to:
receive a saw speed input indicative of a rotational speed of the saw disc;
control the metering valve, based upon the rotational speed of the saw disc, so as to vary the flow area through the metering valve within the continuous range of flow areas in order to regulate the flow of the hydraulic fluid from the pump to the motor;
receive a load sense signal associated with a load pressure downstream of the metering valve; and
control a displacement of the pump based upon the load sense signal,
wherein, during at least a part of a saw recovery operation, the controller controls the pump to supply the hydraulic fluid to the motor corresponding to operating the saw disc above a target operating speed; and
wherein the metering valve regulates the flow of the hydraulic fluid from the pump to the motor to prevent the motor from operating the saw disc above the target operating speed.

8. A control system for a hydraulically operated falling saw head with a saw disc, the control system comprising:
a hydraulic pump and a hydraulic motor arrangement;
a metering valve operatively coupled to the hydraulic pump and the hydraulic motor arrangement, the metering valve having a valve member that is adjustable to vary a flow area through the metering valve over a continuous range of flow areas, in order to regulate a flow of hydraulic fluid within the hydraulic pump and the hydraulic motor arrangement; and
a controller configured to:
receive a saw speed input signal corresponding to a current saw speed; and
execute a saw recovery operation in which the controller operates the metering valve to control the flow of the hydraulic fluid within the hydraulic pump and the hydraulic motor arrangement by providing the flow area through the metering valve that is selected from the continuous range of flow areas based upon the saw speed input signal;
wherein, during at least a part of the saw recovery operation, the controller controls the hydraulic pump to supply the hydraulic fluid to the hydraulic motor corresponding to operating the saw disc above a target saw speed;
wherein the metering valve regulates the flow of the hydraulic fluid from the hydraulic pump to the hydraulic motor to prevent the hydraulic motor from operating the saw disc above the target saw speed;
wherein, during the saw recovery operation, the controller is configured to:
receive a load sense signal associated with a load pressure downstream of the metering valve; and
control a current displacement of a hydraulic pump of the hydraulic pump and motor arrangement based upon the load pressure.

9. The system of claim 8, wherein the controller utilizes the saw speed input signal to compare the current saw speed to the target saw speed; and
wherein, when the current saw speed is less than the target saw speed, the controller operates the metering valve to be in a fully open state with respect to the continuous range of flow areas, the metering valve thereby allowing maximum flow through the metering valve.

10. The system of claim 8, wherein the controller is configured, to control the metering valve, based upon determining that the current saw speed has reached the target saw speed, in order to reduce the flow area through the metering valve, and thereby reduce the flow of the hydraulic fluid from the hydraulic pump to the hydraulic motor.

11. The system of claim 10, wherein the hydraulic pump is a variable displacement pump and the hydraulic motor is a variable displacement motor.

12. The control system of claim 11, wherein, during a motor regulation phase of the saw recovery operation, the controller is configured to:
receive a motor pressure input signal corresponding to a current motor pressure, and compare the current motor pressure to a prescribed motor pressure; and
when the current motor pressure one of approaches and reaches the prescribed pressure, modulate a displacement of the motor in order to maintain the prescribed pressure.

13. The system of claim 12, wherein, during a coasting phase of the saw recovery operation subsequent to the motor regulation phase, the controller is configured to operate the motor at a minimum displacement; and
wherein the coasting phase of the saw recovery operation includes operation of the saw disc at the target saw speed.

14. The system of claim 8, wherein the controller is further configured to:
receive a signal associated with a motor pressure value; and control the metering valve to control the flow area of the metering valve based upon the motor pressure value.

* * * * *

UNITED STATES PATENT AND TRADEMARK OFFICE
CERTIFICATE OF CORRECTION

PATENT NO. : 10,221,870 B2
APPLICATION NO. : 14/677784
DATED : March 5, 2019
INVENTOR(S) : Goedken et al.

Page 1 of 1

It is certified that error appears in the above-identified patent and that said Letters Patent is hereby corrected as shown below:

On the Title Page

Column 2, in the Item (57), under Abstract Line 9, Delete "motor During" and insert -- motor. During --, therefor.

In the Claims

In Column 16, Line 55, in Claim 1, delete "moor" and insert -- motor --, therefor.

In Column 17, Line 21, in Claim 5, delete "a saw" and insert -- the saw --, therefor.

In Column 17, Line 60, in Claim 8, delete "falling" and insert -- felling --, therefor.

In Column 17, Line 62, in Claim 8, delete "a hydraulic" after "and".

Signed and Sealed this
Thirtieth Day of July, 2019

Andrei Iancu
*Director of the United States Patent and Trademark Office*